Aug. 8, 1944.     M. A. WECKERLY     2,355,347
WEIGHING SCALE
Filed April 17, 1942    4 Sheets-Sheet 1
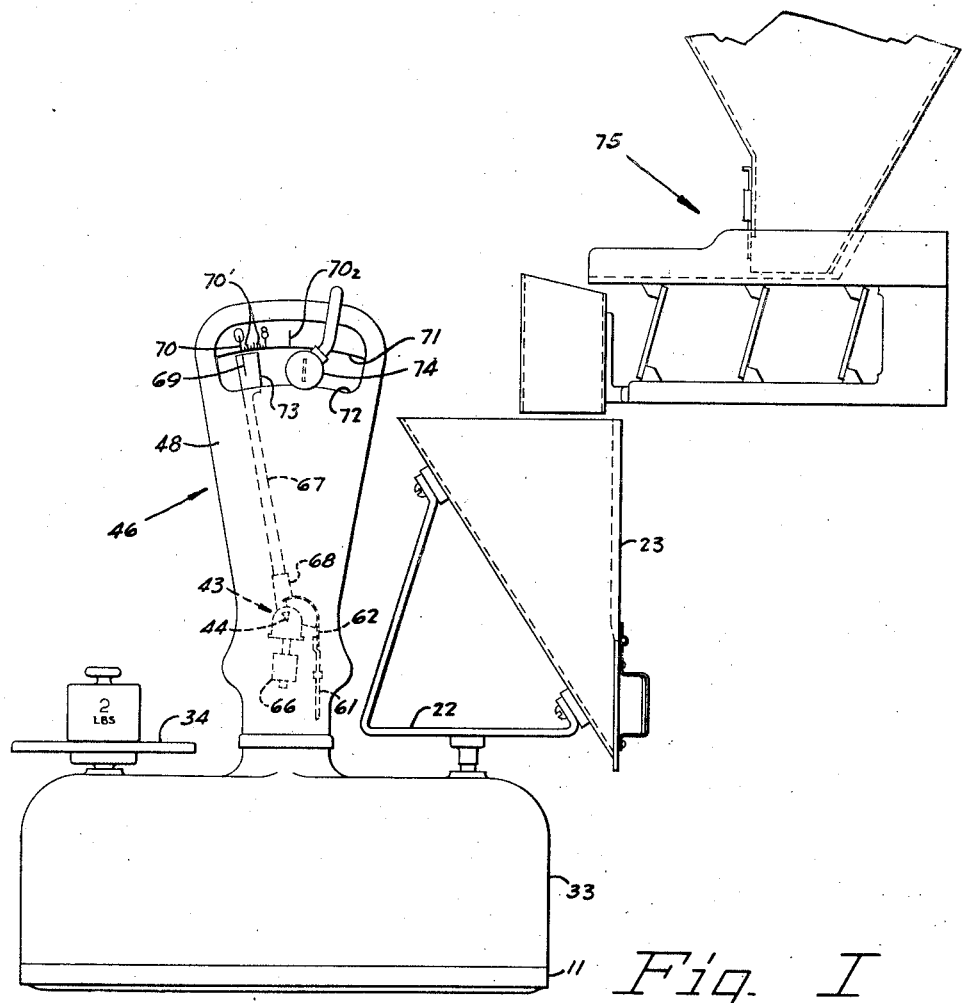
Fig. I
Mark A. Weckerly
INVENTOR
BY Marshall & Marshall
ATTORNEYS Aug. 8, 1944.    M. A. WECKERLY    2,355,347
WEIGHING SCALE
Filed April 17, 1942    4 Sheets-Sheet 2
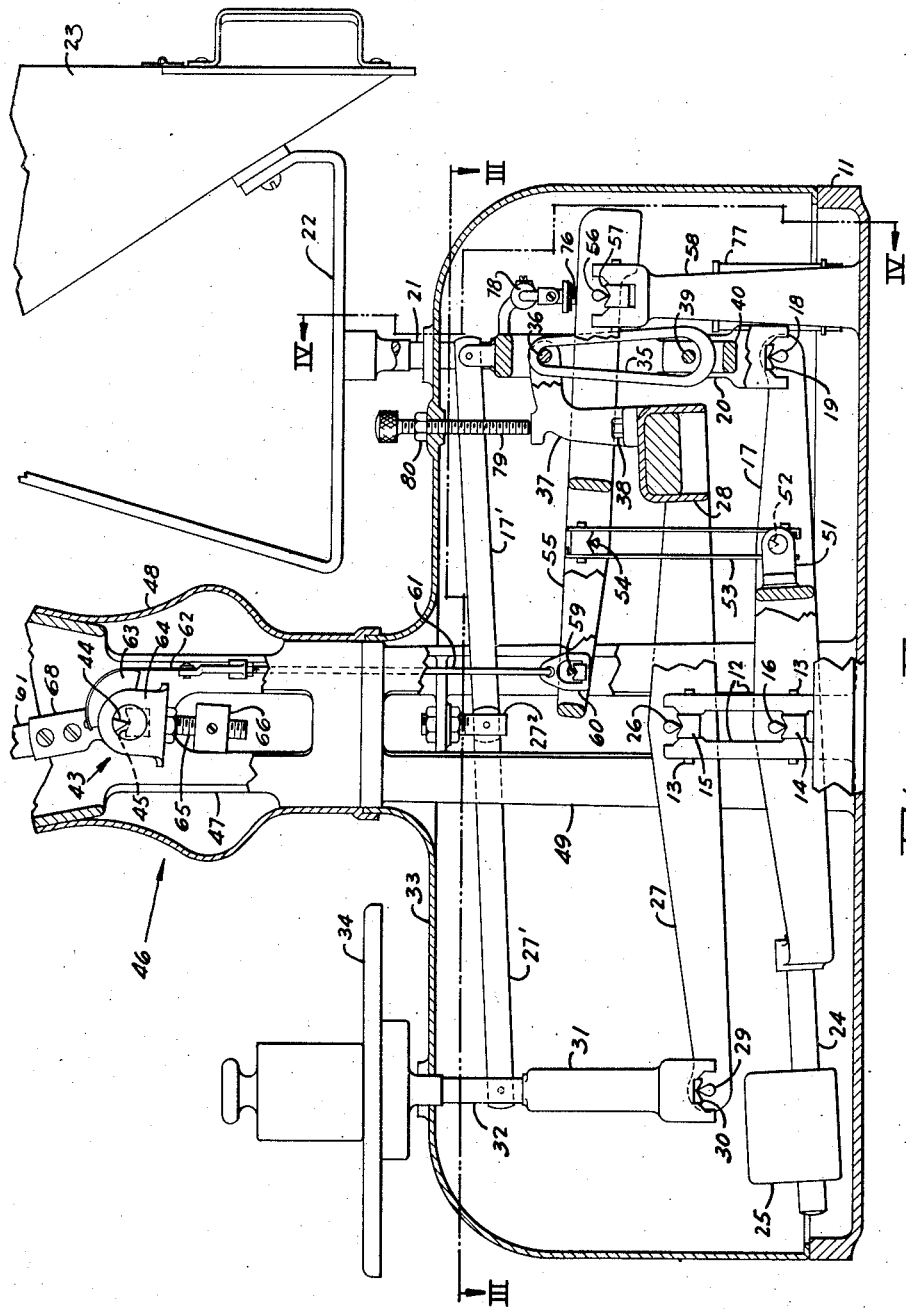
Fig. II
Mark A. Weckerly
INVENTOR
BY Marshall & Marshall
ATTORNEYS Aug. 8, 1944.　　　M. A. WECKERLY　　　2,355,347
WEIGHING SCALE
Filed April 17, 1942　　　4 Sheets-Sheet 3
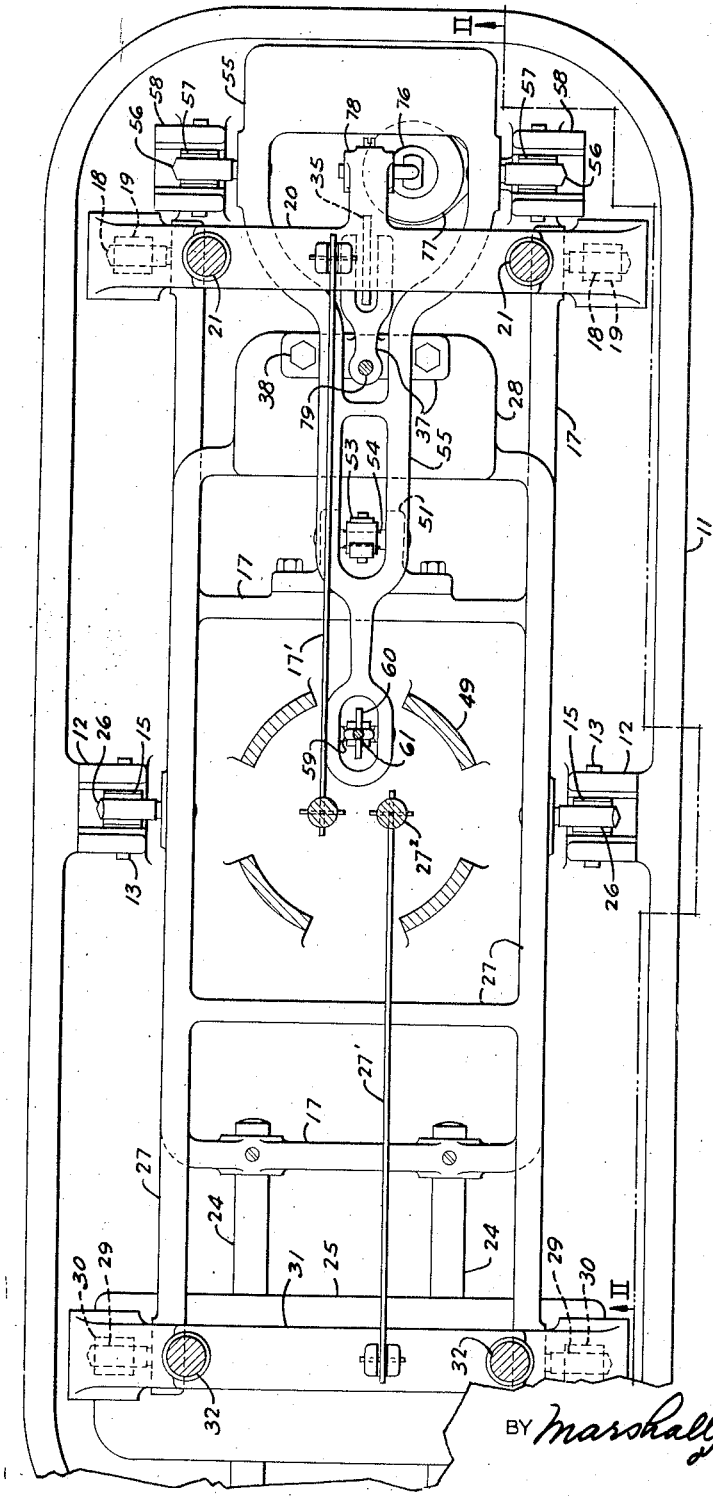
Fig. II
Mark A. Weckerly
INVENTOR
BY Marshall & Marshall
ATTORNEYS Aug. 8, 1944.    M. A. WECKERLY    2,355,347
WEIGHING SCALE
Filed April 17, 1942    4 Sheets-Sheet 4
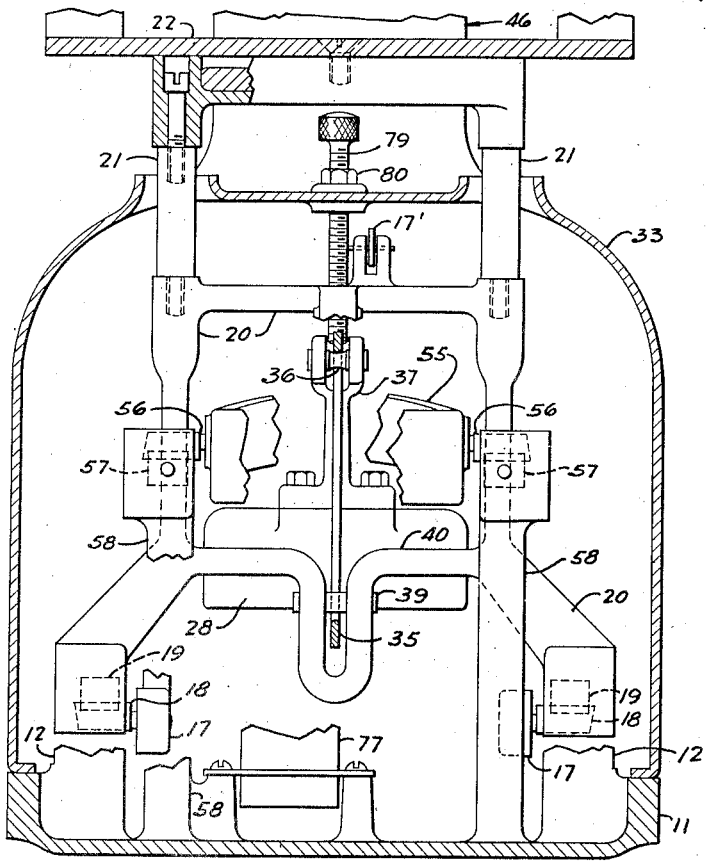
Fig. IV
Mark A. Weckerly
INVENTOR
BY Marshall & Marshall
ATTORNEYS Patented Aug. 8, 1944

2,355,347

UNITED STATES PATENT OFFICE 2,355,347

WEIGHING SCALE

Mark A. Weckerly, Toledo, Ohio, assignor to Toledo Scale Company, Toledo, Ohio, a corporation of New Jersey Application April 17, 1942, Serial No. 439,355

10 Claims. (Cl. 265—48)

This invention relates generally to weighing scales, and more particularly to weighing scales which are adapted to determine and deliver, more or less automatically as by means described in copending application Ser. No. 427,627, loads of predetermined weight. Scales of this kind are usually provided with means whereby the mechanism can be "back-weighted" the amount of the desired load and with a hopper, or other receptacle, into which commodity is fed until its weight counterbalances the back-weight. The material is then discharged into a container. Although the weighing hoppers used in these filling scales are carefully designed so that all the material therein is readily discharged upon cessation of the weighing operation, some commodities, especially in the food industry, do not discharge readily. For example, some materials have a tendency to "bridge." To aid the discharging of such material, it has been the practice to attach electrically, or mechanically actuated means for vibrating the hopper or for rapping on its walls. While these means are effective for some of the difficultly dischargeable materials, they are not effective with others, such as seeded raisins, prunes and similar commodities that are sticky and have a tendency to lump and adhere to the hopper walls. In scales of this type, when "back-weighted" the amount of the predetermined load, the indicator which is usually a part of such a scale becomes active only when the weight of the load approaches the predetermined amount. There is no indication when only a small amount remains in the hopper since the indicator again becomes inactive when a portion of the load is discharged.

The present invention therefore has for its principal object the provision of an improved scale that is particularly adapted for determining loads of predetermined weight.

Another object is the provision of an improved load supporting lever system for predetermined weight weighing scales.

Another object is the provision of means in a scale lever system for automatically disengaging a portion of such system.

Another object is the provision of improved means whereby the indicator of a "back-weighted" scale is in a state of activity for a portion of its weighing operation to indicate the presence of a small amount of material in the weighing hopper.

Still another object is the provision of indicating means in a "back-weighted" hopper scale adapted to indicate the presence in the hopper of an undischarged increment of material.

These, and other objects and advantages will be apparent from the following description in which reference is had to the accompanying drawings, illustrating a preferred embodiment of the invention and wherein similar reference numerals refer to similar parts throughout the several views.

In the drawings:

Fig. I is a front elevational view of a scale embodying the invention.

Fig. II is an enlarged front elevational view of the base and of a fragment of the indicator housing, sectioned substantially along the line II—II of Fig. III.

Fig. III is a sectional plan view of the base, the section being along the line III—III of Fig. II, the base cover being removed; and, Fig. IV is a sectional end elevation of the base, sectioned substantially along the line IV—IV of Fig. II.

Referring to the drawings in detail:

Fig. I, in addition to the scale in which the present invention is embodied, illustrates a vibratory feed material means, the material receiving hopper, as well as photoelectric means for controlling the operation of the feeding means. These means per se form no part of the present invention and are shown only for the sake of clarity, they will be described hereinafter only to such extent as is necessary to fully disclose the invention.

Extending upwardly from a base 11, which preferably is a rigid iron casting, are a pair of bifurcated fulcrum stands 12 supporting, in vertical alignment upon pintles 13 extending between the arms formed by the furcation, V grooved bearings 14 and 15. Resting in the V grooves of the bearings 14 are fulcrum pivots 16 of a load supporting lever 17. In spaced relation to these fulcrum pivots, and positioned adjacent one end of this lever is a pair of load pivots 18, and mounted upon these pivots, by means of suitable V bearings 19, is a load support spider 20. Surmounting posts 21, which are studded in the upper end of this spider, is a load supporting frame 22 to which, in the illustrated embodiment, is fastened a material receiving hopper 23, preferably constructed from sheets of light metal alloy. To balance the dead weight of the spider 20, the frame 22 and the hopper 23, the opposite end of the lever 17 has two horizontal rods 24 studded into a connecting flange and a counterweight 25 adjustably mounted thereon. A check link 17' is provided to guide and maintain the condition of level of the frame 22 in the usual manner.

Supported upon the bearing blocks 15, in the bifurcated fulcrum stands 12, are fulcrum pivots 26 of a counterpoise supporting lever 27. Pivots 29, extending laterally from one of the free ends of the lever 27, support bearings 30 of a counterpoise support spider 31. Two posts 32, studded into the upper end of the spider 31 and extending through suitable apertures in a base cover 33, have secured to their upper ends a counterpoise platter 34. The opposite free end of the lever 27 is provided with an integral "loading box" 28 adapted to be filled with lead to counterbalance the dead weight of the parts resting upon the pivots 29 in its opposite end.

To maintain the condition of level of the counterpoise platter 34, a check link 27' is provided whose ends pivotally engage the counterpoise spider 31 and an adjustable stud 27$^2$ on a pedestal-like member 49 which is erected upon the base 11.

For the purpose of disengageably connecting the load supporting lever 17 and the counterpoise supporting lever 27, a link 35 is provided. This link is suspended from a pin 36 extending between two short horizontally projecting arms of a bracket 37 bolted, as at 38, to the loading box 28. The lower portion of the link, when the lever 27 is cooperating with the lever 17 to counterbalance the weight of a load, engages a pin 39 extending between the arms of a loop formed by a connecting rib 40 of the load spider 20.

The "pull" resulting from a load as it accumulates in the hopper 23 is transmitted, as usual, to a load counterbalancing pendulum 43 that is supported, by means of a pivot 44, upon a bearing 45, suitably mounted within an indicator housing 46 which surmounts the pedestal-like member 49 arising from the base 11. The indicator housing 46 comprises a frame 47 and cover members 48. To accomplish the transmission of this "pull," two short spaced arms 51, projecting horizontally from a connecting rib of the lever 17, carry a pivot 52 which engages the lower end of a stirrup 53 whose upper end is suspended from a pivot 54 in a pendulum lever 55. This pendulum lever, which is of the second order, is rockably mounted, by means of a fulcrum pivot 56, upon bearings 57 seated in the upper end of fulcrum stands 58 projecting upwardly from the base 11. A power pivot 59, in the opposite end of the lever 55, engages a stirrup 60 on the lower end of a draft rod 61. The upper end of this draft rod is secured to a thin flexible metallic ribbon 62 which overlies and is fastened to the upper end of the arcuate face of a power sector 63, which is a component part of the pendulum 43. This pendulum in addition comprises a body portion 64, a stem 65 studded into this body portion, and a pendulum weight 66 which is threaded upon the stem 65 in the usual manner.

For the purpose of indicating the condition of balance, an indicator 67 is fastened to an extending finger 68 of the body portion 64. This indicator is provided with the usual index line 69 for cooperation with a zero indicium 70 marked on a chart 71 fastened to the upper end of the frame 47 within the covers 48. This chart is visible through a window 72 in the housing 46. In addition to the zero indicium 70, a limited number of weight indicia 70' are marked on this chart and spaced from the last indicium in this series is another indicium 70$^2$. The indicium represents the automatic counterbalancing capacity of the pendulum 43, but in the embodiment of the invention herein described it serves to indicate that the moment of a load in the hopper exactly balances the moments of the pendulum and of any counterpoises on the platter 34, in a manner which will hereinafter be more fully described. The upper extremity of the indicator 67 is further provided with a flag-like projecting portion 73 having a leading straight edge which is adapted to intercept light emanating from a source 74 when the index line 69 is in registry with the indicium 70$^2$. The interception of the light causes a photoelectric element (not shown) to be de-energized. This photoelectric element controls a vibrator feeding device 75, stopping its operation when a load of the predetermined weight has accumulated in the hopper 23.

To damp the oscillations of the scale, a dashpot is provided whose plunger 76, movable within an oil-filled dashpot body 77, is pivotally connected, as at 78, to the load spider 20.

To limit the rocking movement of the counterpoise supporting lever 27, a screw 79 is adjustably threaded through the base cover 33 so that its lower end forms a stop for the lever 27 by engaging a surface on the upper portion of the bracket 37 which is bolted to this lever. A nut 80 serves to lock this stop screw in adjusted position. By these means, the angle of upward oscillation of the adjacent end of the lever 27 can be very accurately determined.

In conditioning the device for operation, the operator adjusts the screw 79 so that that end of the lever 27 from which the link 35 is suspended is stopped in a position in which the clearance between the bottom of the pin 39 and the link 35 just permits the load lever 17 to rock through an angle that is sufficient to allow the pendulum 43, which is operatively connected thereto, to rock through a proportionate angle that permits the index 69 to travel from its position in registration with the zero indicium of the limited series of weight indicia 70 to the last indicium of this series when a corresponding load is in the material hopper 23. During this stroke of the lever 17, any load that is placed in the hopper is counterbalanced entirely by the pendulum 43. The lever 27 being inoperative, any counterpoise weight on the platter 34 asserts no influence on the weighing mechanism. When the lever 27 is inoperative, the levers 17, 55, the check link 17', the load supporting members supported by the lever 17, and the pendulum with the indicator form an automatically indicating scale adapted to indicate the weight of loads within the capacity of the series 70' of weight indicia on the chart 71. The instant, however, that the index 69 comes into registration with the last indicium in the series 70', the bottom of the pin 39 lightly contacts the link 35 in the downward stroke of the load spider 20 and further commodity fed into the hopper exerts a pull against the lever 27 and a counterpoise standing on the platter 34 assumes its function in counterbalancing the load.

For example, it is desired to pack prunes in 3 pound increments into suitable cartons, and assuming that the automatic indicating range of the series 70' is 8 ounces, and further assuming that the automatic load counterbalancing capacity of the pendulum 43 is one pound as represented by the indicium 70$^2$, the operator then places sufficient counterpoise weight on the platter 34 until the sum of their weight, plus the automatic counterbalancing capacity of the pendulum equals 3 pounds. In this example counterpoise weights weighing 2 pounds must be placed on the platter 34. In the operation the operator then energizes the feeding means 75 which feeds prunes into the hopper 23. During the accumulation of the first 8 ounces of prunes, the indicator moves from its zero position until its index registers with the 8 ounce mark. As previously mentioned, the link 35 is then engaged by the pin 39 in the load spider and the lever 27 assumes its function. The lever system in effect becomes one of the even balance type. As the weight of the commodity in the hopper 23 nearly equals the combined resistance of the pendulum and of the counterpoise weights on the platter 34, the indicator 67 again starts to move until the index registers with indicium $70^2$ indicating balance. The edge of the flag-like projection in this position intercepts all light from the source 74, de-energizing the photoelectric tube, and in the known manner, stops the operation of the feeding means 75 so that no more commodity is fed into the hopper. When this has taken place, the operator opens a gate on the hopper 23 and permits the commodity to drop into a carton or other container. When a portion of the commodity in the hopper has been discharged, the counterpoise weights on the platter 34 immediately function and return the scale members to their original position. If all of the material is discharged from the hopper, the indicator, after the lever 27 engages the end of the screw 79 and disconnects from the lever 17, is free to return into registration with the zero indicium 70, but the weight of any commodity remaining in the hopper prevents this and its amount is indicated by the cooperation of the indicator and the series of indicia 70'.

Having described the invention, I claim:

1. In a device of the class described, in combination, weighing mechanism comprising load supporting means, load counterbalancing mechanism operatively connected thereto and load indicating means actuated by said load counterbalancing mechanism, said load supporting means including a load lever and a counterpoise lever, a pair of fulcrum pivots in each of said levers, bearings mounted in spaced vertical relation for receiving said pairs of fulcrum pivots and supporting said levers for oscillating movement, a pair of load pivots in one end of each of said levers, a load supporting spider mounted upon said load pivots in said load lever, a load receiver mounted upon said load supporting spider for supporting a load to be weighed, a counterpoise supporting spider mounted on said load pivots in said counterpoise lever and a receiver mounted on said counterpoise supporting spider for supporting a counterpoise, means on each of said levers for offsetting the dead weight of the said spider and receiver mounted thereon, a pivotally mounted motion transmitting lever, a pivotal connection between said load lever and said motion transmitting lever, a pivotal connection between said motion transmitting lever and said load counterbalancing mechanism for transmitting such oscillating movement of said load lever to said load counterbalancing mechanism, a link operatively connecting said load lever and said counterpoise lever, and adjustable stop to arrest the motion of said counterpoise lever for disengaging said link from one of said levers at a predetermined angle of its oscillating movement whereby such load supported on said load receiver is counterbalanced solely by said load counterbalancing mechanism and its weight is directly indicated by said load indicating means.

2. In a device of the class described, in combination, weighing mechanism for weighing loads of predetermined weight comprising a load lever mounted for oscillating movement, load receiving means mounted upon said load lever, means for stabilizing said load receiving means, a load counterbalancing pendulum for counterbalancing the weight of an increment of said load, means for operatively connecting said load lever to said pendulum, an oscillating counterpoise lever, a counterpoise receiver mounted upon said counterpoise lever adapted to support a counterpoise for counterbalancing the remaining increment of such predetermined load, means for operatively connecting said counterpoise lever and said load lever, a stop for initially holding said means for operatively connecting said counterpoise lever and said load lever out of engagement, whereby an increment of load on said load receiver is counterbalanced solely by said load counterbalancing pendulum, and means for adjusting said stop for determining the initial position of said counterpoise lever whereby said operative connection between said counterpoise lever and said load lever becomes effective after a predetermined increment of load has been placed on the load receiver and whereby the remainder of the load on the load receiver is counterbalanced by a counterpoise on said counterpoise receiver, indicating means comprising an indicator secured to said pendulum and an indicia-bearing chart for indicating directly the weight of such increment of load counterbalanced by said pendulum and the condition of balance when the weight of the increment comprising the remainder of the load is counterbalanced by such counterpoise on said counterpoise receiver.

3. In a device of the class described, in combination, weighing mechanism for weighing loads of predetermined weight comprising a lever system, a load counterbalancing pendulum operatively connected thereto for counterbalancing an initial increment of such load, and indicating means actuated by said load counterbalancing pendulum for indicating the weight of such increment, said lever system including a pair of levers, one of said levers being adapted to support a load, the other of said levers being adapted to support a counterpoise to backweight said weighing mechanism for determining a final increment of such load of predetermined weight, said indicating means also being adapted to indicate the condition of balance of said weighing mechanism when such final increment of load is counterbalanced by such counterpoise, and means cooperating with the movement of said levers for automatically causing said counterpoise to become ineffective when a portion of such load on said load receiver has been removed whereby the remaining portion of such load on said load receiver acts solely on said counterbalancing pendulum, and said indicating means indicates the weight of such remaining portion.

4. In a device of the class described, in combination, weighing mechanism including load supporting means, load counterbalancing mechanism associated therewith and load indicating means actuated by said load counterbalancing mechanism, said load counterbalancing mechanism comprising a load counterbalancing pendulum, said load indicating means comprising an indicator and a chart, a series of weight indicia including a zero indicium marked on said chart and another indicium marked on said chart in spaced relation to said series of weight indicia, said load supporting means including a load supporting lever, a counterpoise supporting lever, and a pendulum lever, a connection between said pendulum lever and said load counterbalancing pendulum, a connection between said load supporting lever and said counterpoise supporting lever, said latter connection being disengageable, means limiting the stroke of said counterpoise supporting lever for automatically disengaging said levers during a predetermined portion of the stroke of said load supporting lever, said indicator being adapted to indicate weights of loads on said load supporting means in cooperation with said zero indicium and said series of indicia on said chart when said load supporting lever is disengaged from said counterpoise supporting lever, and said indicator being adapted to indicate weights of loads in cooperation with said spaced indicium on said chart when said counterpoise supporting lever is connected to said load supporting lever.

5. In a device of the class described, in combination, a load supporting lever system, load counterbalancing mechanism operatively connected thereto, load indicating means actuated by said load counterbalancing mechanism, said load supporting lever system comprising a rockably mounted load supporting lever of the third order, a rockably mounted counterpoise supporting lever of the first order, a rockably mounted motion transmitting lever of the second order, a conection between said motion transmitting lever and said load counterbalancing mechanism, a connection for connecting said motion transmitting lever to said load supporting lever, a disengageable connection between said load supporting lever and said counterpoise supporting lever, means limiting the travel of said counterpoise supporting lever for causing said connection between said counterpoise supporting lever and said load supporting lever to disengage during predetermined portions of the stroke of said load supporting lever, whereby said load supporting lever continuously functions as a lever of the third order and said counterpoise supporting lever functions to counterbalance a portion of the load supported by said load supporting lever system when said disengageable connection connects said counterpoise supporting lever and said load supporting lever.

6. In a device of the class described, in combination, weighing mechanism comprising load supporting means, load counterbalancing mechanism operatively connected thereto and indicating means actuated by said load counterbalancing mechanism, said load supporting means including a pair of levers, a load receiver mounted upon one of said levers, a counterpoise receiver mounted upon the other of said levers, said load counterbalancing mechanism comprising a pendulum, a motion transmitting lever, a connection between said load supporting lever and said motion transmitting lever, a connection between said motion transmitting lever and said load counterbalancing pendulum, a link connection between said counterpoise supporting lever and said load supporting lever whereby a counterpoise on said counterpoise receiver cooperates with said pendulum to offset a load on said load receiver, a cover for housing said levers, and means limiting the travel of said counterpoise supporting lever for automatically disconnecting said counterpoise supporting lever from said load supporting lever during a portion of the stroke of said load supporting lever whereby a load on said load receiver is solely counterbalanced by said pendulum, said means limiting the travel of said counterpoise supporting lever for disconnecting said counterpoise supporting lever from said load supporting lever comprising a screw adjustably threaded through said cover members and adapted to engage a portion of said counterpoise supporting lever whereby the time of disengagement of said counterpoise supporting lever from said load supporting lever is determinable during the operation of said weighing mechanism.

7. In a device of the class described, in combination, weighing mechanism comprising load supporting means, load counterbalancing mechanism operatively connected thereto and indicating means actuated by said load counterbalancing mechanism, said load supporting means including a pair of levers, one of said levers being adapted to support a load, the other of said levers being adapted to support a counterpoise, said load counterbalancing mechanism comprising a pendulum, a motion transmitting lever, a connection between said load supporting lever and said motion transmitting lever, a connection between said motion transmitting lever and said pendulum, a link connection between said counterpoise supporting lever and said load supporting lever whereby a load on said load supporting lever is counterbalanced by the cooperation of a counterpoise on said counterpoise lever and said pendulum, a cover for housing said levers and means capable of adjustment exteriorly of said cover for arresting the motion of said counterpoise lever to effect disconnection of said counterpoise supporting lever from said load supporting lever whereby a load on said load supporting lever is solely counterbalanced by said pendulum.

8. In a device of the class described, in combination, a lever system, a load counterbalancing mechanism operatively connected thereto and load indicating means actuated thereby, said lever system comprising a load supporting lever, a counterpoise supporting lever and a motion transmitting lever, a connection between said load supporting lever and said motion transmitting lever, a connection between said motion transmitting lever and said load counterbalancing mechanism, a load supporting spider mounted upon one end of said load supporting lever, a pin associated with said counterpoise supporting lever, a pin in said load supporting spider, a link freely suspended from said pin associated with said load supporting lever, said link being adapted to engage said pin in said load supporting spider, a cover member for housing said lever system and means comprising a screw threaded through said cover member for engaging said counterpoise lever to arrest its motion thus causing said link to disengage said pin in said load supporting spider upon further motion of said load supporting lever.

9. In a device of the class described, in combination, a lever system, a load counterbalancing mechanism operatively connected thereto and load indicating means actuated by said load counterbalancing mechanism, said lever system comprising a load supporting lever, a load supporting spider pivotally mounted upon said load supporting lever, a pin in said spider, a counterpoise supporting lever, a motion transmitting lever, a connection between said motion transmitting lever and said load counterbalancing mechanism, a connection between said motion transmitting lever and said load supporting lever, a disengageable connection for operatively connecting said load supporting lever and said counterpoise suporting lever, means limiting the motion of said counterpoise lever for causing said disengageable connection to disengage upon further motion of said load supporting lever, said disengageable connection comprising a pin associated with said counterpoise supporting lever, a link freely suspended from said pin and adapted to engage said pin in said load supporting spider.

10. In a device of the class described, in combination, a lever system, automatic load counterbalancing mechanism operatively connected thereto and load indicating means actuated by said load counterbalancing mechanism for counterbalancing and indicating minor increments of weight, said lever system including a load supporting lever, a counterpoise supporting lever, a connection between said load counterbalancing mechanism and said load supporting lever, a disengageable connection between said load supporting lever and said counterpoise supporting lever and means limiting the stroke of said counterpoise supporting lever causing said counterpoise supporting lever to disengage from said load supporting lever during the portion of the stroke of said load supporting lever.

MARK A. WECKERLY.